Patented Oct. 24, 1922.

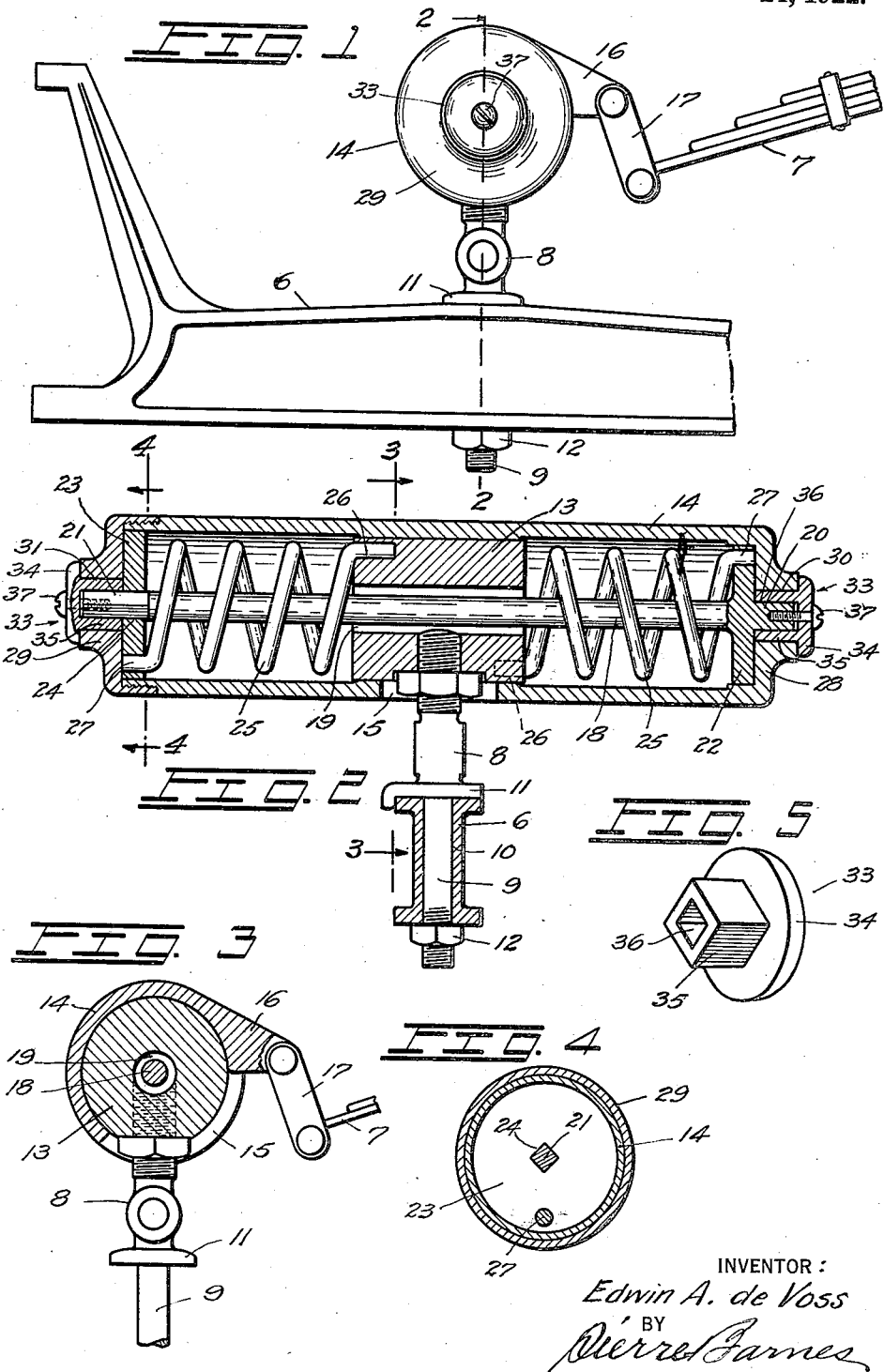

1,433,192

UNITED STATES PATENT OFFICE.

EDWIN A. DE VOSS, OF SEATTLE, WASHINGTON.

SHOCK ABSORBER.

Application filed September 14, 1921. Serial No. 500,540.

*To all whom it may concern:*

Be it known that I, EDWIN A. DE VOSS, a citizen of the United States, residing at Seattle, in the county of King and State of Washington, have invented certain new and useful Improvements in Shock Absorbers, of which the following is a specification.

This invention relates to devices for use on motor vehicles to serve as shock absorbers or snubbers in absorbing and eliminating road shocks or stresses which are injurious to the vehicle springs and oftentimes render riding extremely unpleasant to the occupants of the vehicle.

The object of the invention is to produce a shock absorber of this character which will be of simple and inexpensive construction and be durable and efficient in use.

Other objects and advantages of the invention will appear in the following specification.

The invention consists in the novel construction, adaptation and combination of parts hereinafter described and claimed.

In the accompanying drawings,—

Figure 1 is a front elevational view of parts of an automobile axle and the associated vehicle spring showing my improved shock absorber applied thereto. Fig. 2 is a longitudinal vertical section taken substantially through 2—2 of Fig. 1. Figs. 3 and 4 are detail sectional views through 3—3 and 4—4 of Fig. 2. Fig. 5 is a perspective view of one of the shaft-and-casing coupling members, shown detached.

In said drawing, the reference numeral 6 represents a portion of an automobile front-axle and 7 is a portion of a semi-elliptical vehicle spring upon which is supported the vehicle frame, not shown, in any usual or suitable manner.

A shock absorber according to the present invention is interposed between said axle and spring members to supplement the function of the latter and neutralize or prevent shocks being transmitted from the axle to the spring.

In carrying out my invention, I provide a post 8 having a stem 9 which, as shown, extends through a hole 10 of the axle 6 and is rigidly secured thereto between a shoulder element 11 of post which seats upon the axle and a nut 12 taking on a threaded part of the post stem 9 and engaging against the axle.

The upper end of the post 8 is screwed into or otherwise rigidly secured to a cylindrical block 13 to have the axis of the block disposed longitudinally of the vehicle. Said block is mounted for relative rotary and axial movements in a substantially cylindrical casing 14 and at about its midlength the casing is provided with a peripheral slot 15 to accommodate movements of the casing with respect to said post.

Formed integral with or rigidly secured to said casing is an arm 16 which is connected to the vehicle spring 7 by means of links such as 17. Provided within the casing chamber and disposed axially thereof is a shaft 18 which extends, as shown in Figs. 2 and 3, through an aperture 19 of the block 13.

Both ends 20 and 21 of said shaft are of polygonal shapes, preferably square, in transverse section. Adjacent to its respective extremities, said shaft is provided with circular collars 22 and 23, of which the collar 22 is advantageously formed integral with the shaft 18 and the other collar 23 is provided with a central polygonal opening 24, Fig. 4, which fits upon the correspondingly shaped end portion 21 of the shaft, whereby both collars are arranged to rotate in unison with the shaft.

Located within said casing between the block 13 and each of the collars is a torsional spring 25 whose ends 26 and 27 engage the block and the respective collar by extending into holes provided therein as shown in Fig. 2.

In the wall 28 at one end of the cylinder and in a removable cap 29 at the other end of the cylinder are centrally disposed polygonal holes 30 and 31 of greater diameters than the respective polygonal portions 20 and 21 of the shaft which extend into the same.

33 represents locking devices, one for each end of the casing, for releasably securing the shaft against independent rotary movement to the casing. As shown in Fig. 5, each of such locking devices comprises a plate element 34 from which protrudes a thimble 35 of an external polygonal shape to fit within the hole 30, or 31, of a casing end and having a polygonal socket 36 to receive an end of the shaft 18. The locking devices above referred to are secured against accidental displacement as by means of set screws 37 engaging in the respective shaft ends.

The absorber is applied by securing the post stem 9 in the axle 6 and connecting the casing arm 16 by the links 17 to the adjacent end of the vehicle spring 7. Being thus arranged and with the locking devices 33 temporarily removed, the shaft 18 is rotated by means of a suitable socket wrench inserted in an opening, 30 or 31, in one of the casing ends to engage a polygonal end, 20 or 21, of the shaft. By turning the shaft 18 in the proper direction the collars 22 and 23 are caused to rotate to effect the winding of both springs 25 to afford the requisite torsional resistance.

With the springs thus wound the locking devices 33 are successively inserted in the casing openings to engage over the respective shaft ends thereby rigidly coupling the shaft to the casing.

In operation, the springs 25 act to yieldingly retain the casing 14 in a rotary position to absorb any sudden shocks or vertical movements of the axle with respect to the vehicle spring. The springs 25 by being disposed one in front of the other and longitudinally of the vehicle serve moreover to cushion and overcome movements of the vehicle spring and the vehicle body which is connected thereto with respect to the axle.

What I claim is,—

1. The combination with a pair of vehicle members disposed one above the other, of a cylindrical block rigidly connected to the lower of said members, a casing journaled upon said block, a torsional spring provided in said casing, said spring having one of its ends connected to said block, means for releasably connecting the other end of said spring with the casing, and rotative means arranged axially within said casing for regulating the effective power of said spring.

2. The combination with a vehicle axle and the associated vehicle spring, of a cylindrical casing provided with a circumferentially arranged slot in its periphery, a post rigidly secured to said axle and extending through said slot into the casing, a cylindrical block fitted within said casing to afford rotary movements thereto and rigidly secured to said post, a shaft located within said casing, means for releasably connecting said shaft with the casing to rotate in unison therewith, a torsional spring provided in said casing at each end of said block, said springs being each connected at their opposite ends with said shaft and the block, and means for operatively connecting said vehicle spring with the casing.

3. The combination with a vehicle spring and axle, of a shock absorber comprising a cylindrical casing having an arm extending laterally therefrom, said casing being provided with a polygonal opening in each of its ends and having a circumferentially disposed slot in the peripheral wall of the casing at approximately the midlength of the same, an apertured cylindrical block provided in said casing, a support extending through the casing slot for rigidly connecting said block with said axle, a shaft provided in said casing and extending through the block aperture, said shaft being provided with polygonal extremities which are located in the respective casing end openings, collars provided on said shaft adjacent to the respective ends of the casing, torsional springs positioned in the casing at opposite sides of said block and having their ends operatively connected to said block and the respective shaft-collars, and thimble devices insertible in said cylinder openings, said devices being adapted to engage upon the ends of the shaft for rigidly connecting the latter to the casing.

4. The combination with a vehicle spring and axle, of a shock absorber comprising a cylindrical block member, a casing member mounted thereon for relative rotary movements, a torsional spring connected to said block member and the casing member, means for rigidly connecting said block member to said axle, and link connection between the casing member and the vehicle spring.

Signed at Seattle, Washington, this 8th day of September, 1921.

EDWIN A. DE VOSS.

Witnesses:
PIERRE BARNES,
MARGARET G. SUPPLE.